United States Patent
Kozak (10) Patent No.: US 9,245,014 B2
(45) Date of Patent: Jan. 26, 2016

(54) CLUSTERING OF FEEDBACK REPORTS

(75) Inventor: Michal M. Kozak, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 703 days.

(21) Appl. No.: 13/553,108

(22) Filed: Jul. 19, 2012

(65) Prior Publication Data

US 2013/0031094 A1    Jan. 31, 2013

Related U.S. Application Data

(63) Continuation of application No. PCT/PL2011/000082, filed on Jul. 28, 2011.

(51) Int. Cl.
*G06F 17/30* (2006.01)

(52) U.S. Cl.
CPC ...... *G06F 17/3071* (2013.01); *G06F 17/30598* (2013.01); *G06F 17/30864* (2013.01)

(58) Field of Classification Search
CPC .......... G06F 17/3071; G06F 17/30864; G06F 17/30598
USPC .................................. 707/737, 802, 803, 804
See application file for complete search history.

(56) References Cited

U.S. PATENT DOCUMENTS

2003/0110181 A1\* 6/2003 Schuetze et al. .............. 707/802

OTHER PUBLICATIONS

PCT Notification of Transmittal of International Search Report and Written Opinion of International Searching Authority for International Application No. PCT/PL2011/000082, May 18, 2012 (10 pages).
Patrick Francis et al. "Tree-Based Methods for Classifying Software Failures," *Proceedings of the 15th International Symposium on Software Reliability Engineering*, 2004, (ISSRE '04), pp. 451-462, XP010769654.
A.K. Jain et al., "Data Clustering: A Review," *ACM Computing Surveys*, vol. 31, No. 3, Sep. 1999, pp. 264-323.
International Preliminary Report on Patentability for International Application No. PCT/PL2011/000082, dated Jan. 28, 2014, 8 pages.

\* cited by examiner

*Primary Examiner* — Shahid Alam
(74) *Attorney, Agent, or Firm* — Fish & Richardson P.C.

(57) ABSTRACT

A computer-implemented method comprising: receiving a first report related to an application configured to run on one or more computing devices; identifying one or more terms included in the first report; identifying one or more second reports including at least one of the one or more terms; retrieving a term relevance value for a term included in at least one of the one or more second reports; determining that the term relevance value is less than a term relevance threshold value; identifying at least one of the one or more second reports for a clustering process, wherein at least one of the one or more second reports that include the term is excluded from the clustering process; implementing the clustering process using the identified at least one of the one or more second reports; and assigning the first report to a cluster.

22 Claims, 3 Drawing Sheets

CLUSTERING OF FEEDBACK REPORTS

This application is a continuation of International Application Serial No. PCT/PL2011/000082, filed on Jul. 28, 2011, which is incorporated herein by reference.

BACKGROUND

Computing devices such as smart phones may be configured to run applications. Generally, an application is software that runs on the resources of the computing device. A user of the computing device may encounter an error in the application, for example, while the computing device is running the application.

The application may include a link to a web page, contents of a web page, application specific information (e.g., logs and stack traces of exceptions), and/or system specific information (e.g., operating system information, browser information, installed plugins and applications, and the like) to allow the user to report an error to a developer of the application. The user may enter information specifying a type of error encountered, by interacting with controls or fields included on the web page (and/or the application itself—as feedback reports may be sent from applications running on computing devices). The web page may in turn send the information to a server system that is configured to collect information indicative of errors encountered by user of the application.

SUMMARY

According to one general implementation the subject matter described in this specification may be embodied in methods that include the actions of receiving a first report related to an application configured to run on the one or more computing devices; identifying one or more terms included in the first report; identifying one or more second reports including at least one of the one or more terms, with the one or more second reports being associated with a plurality of clusters of reports; retrieving a term relevance value for a term included in at least one of the one or more second reports, the term relevance value indicative of a relevance of the term to the at least one of the one or more second reports; determining that the term relevance value is less than a term relevance threshold value; identifying, at least partly based on determining, at least one of the one or more second reports for a clustering process; implementing the clustering process using the identified at least one of the one or more second reports; and assigning, based on the clustering process, the first report to a cluster in the plurality of clusters.

Implementations of the disclosure may include one or more of the following features. In some implementations, the term relevance value for the term is at least partly based on a number of the one or more second reports that include the term. In other implementations, the method includes sharding the cluster by generating one or more segments and populating the one or more segments with reports assigned to the cluster. In still other implementations, the method also includes generating a resource relevance value for a report assigned to the sharded cluster, with the relevance value indicative of a relevance of the report to a pre-defined attribute.

In some implementations, the method includes populating the one or more segments based on values of relevance values of reports assigned to the sharded cluster, with reports associated with relevance values having higher values being placed in a segment before reports associated with relevance values having lower values. In other implementations, the method includes generating one or more resource relevance values for the one or more second reports, with a resource relevance value indicative of a relevance of a second report to the first report; wherein the clustering process assigns the first report to the cluster at least partly based on the one or more resource relevance values of the one or more second reports that are associated with the cluster.

In still other implementations, identifying at least one of the one or more second reports for the clustering process comprises: excluding from the clustering process at least one of the one or more second reports that includes the term. In some implementations, identifying at least one of the one or more second reports for the clustering process comprises: including in the clustering process at least one of the one or more second reports that includes the term.

In another aspect of the disclosure, one or more machine-readable media are configured to store instructions that are executable by one or more processing devices to perform operations including receiving a first report related to an application configured to run on the one or more computing devices; identifying one or more terms included in the first report; identifying one or more second reports including at least one of the one or more terms, with the one or more second reports being associated with a plurality of clusters of reports; retrieving a term relevance value for a term included in at least one of the one or more second reports, the term relevance value indicative of a relevance of the term to the at least one of the one or more second reports; determining that the term relevance value is less than a term relevance threshold value; identifying, at least partly based on determining, at least one of the one or more second reports for a clustering process; implementing the clustering process using the identified at least one of the one or more second reports; and assigning, based on the clustering process, the first report to a cluster in the plurality of clusters.

Implementations of this aspect of the present disclosure may include one or more of the foregoing features.

In still another aspect of the disclosure, an electronic system includes one or more processing devices; and one or more machine-readable media configured to store instructions that are executable by the one or more processing devices to perform operations including: receiving a first report related to an application configured to run on the one or more computing devices; identifying one or more terms included in the first report; identifying one or more second reports including at least one of the one or more terms, with the one or more second reports being associated with a plurality of clusters of reports; retrieving a term relevance value for a term included in at least one of the one or more second reports, the term relevance value indicative of a relevance of the term to the at least one of the one or more second reports; determining that the term relevance value is less than a term relevance threshold value; identifying, at least partly based on determining, at least one of the one or more second reports for a clustering process; implementing the clustering process using the identified at least one of the one or more second reports; and assigning, based on the clustering process, the first report to a cluster in the plurality of clusters.

Implementations of this aspect of the present disclosure may include one or more of the foregoing features.

In yet another aspect of the disclosure an electronic system includes means for receiving a first report related to an application configured to run on the one or more computing devices; means for identifying one or more terms included in the first report; means for identifying one or more second reports including at least one of the one or more terms, with the one or more second reports being associated with a plurality of clusters of reports; means for retrieving a term relevance value for a term included in at least one of the one or more second reports, the term relevance value indicative of a relevance of the term to the at least one of the one or more second reports; means for determining that the term relevance value is less than a term relevance threshold value; means for identifying, at least partly based on determining, at least one of the one or more second reports for a clustering process; means for implementing the clustering process using the identified at least one of the one or more second reports; and means for assigning, based on the clustering process, the first report to a cluster in the plurality of clusters.

Implementations of this aspect of the present disclosure may include one or more of the foregoing features.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
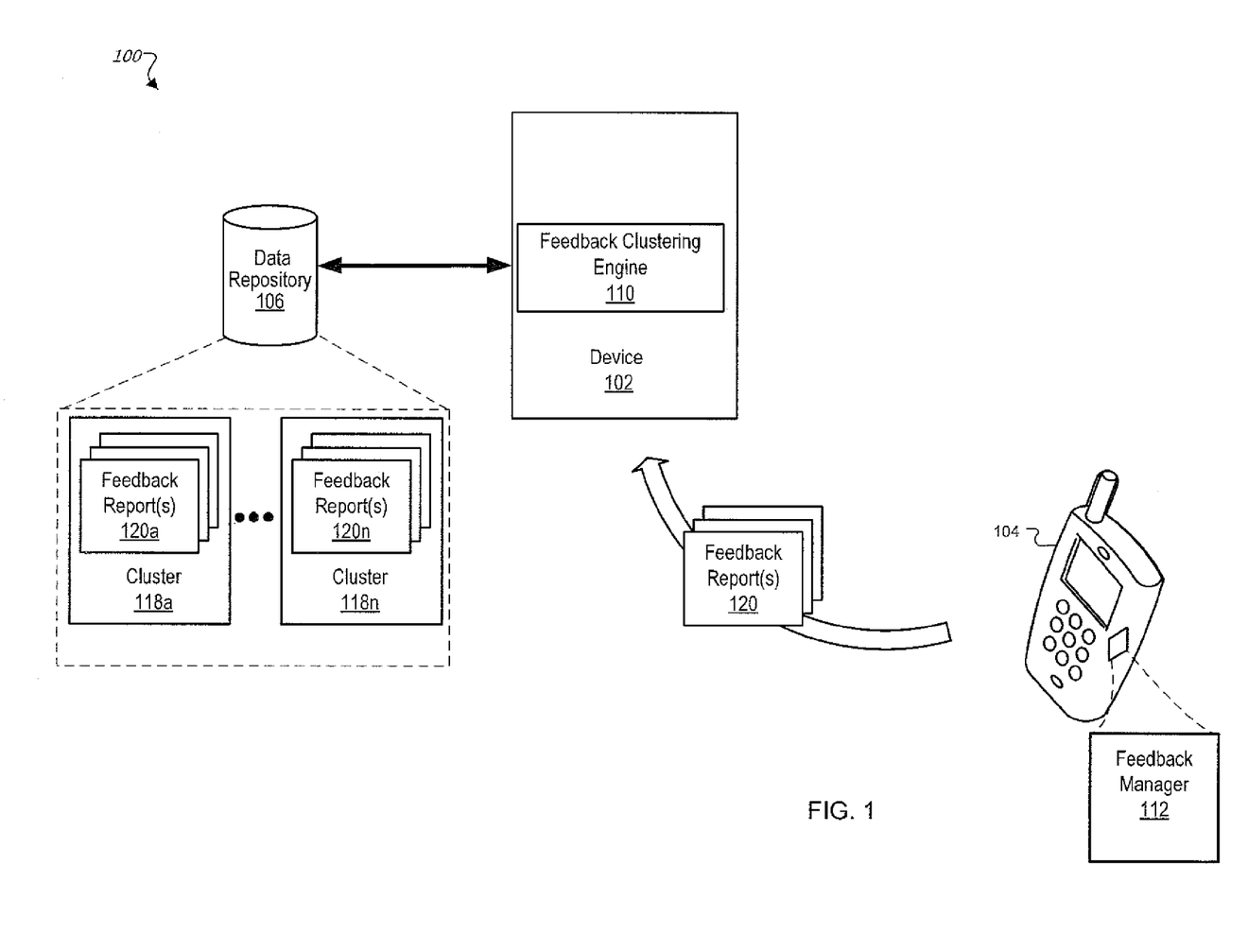
FIG. 1 is a diagram of an example system that that generates clusters of feedback reports.

FIG. 1 is a diagram of example system 100 that generates clusters 118a-118n of feedback reports 120. Device 102 includes feedback clustering engine 110. Feedback clustering engine 110 is configured to generate clusters 118a-118n from feedback reports 120. In particular, feedback clustering engine 110 separates feedback reports 120 into feedback reports 120a-120n, with each of feedback reports 120a-120n assigned to one of clusters 118a-118n.

Generally, device 102 receives numerous types of resources and generates clusters of similar resources. Generally, a resource includes an item of data, such as feedback reports, documents (e.g., documents that are accessible over the Internet and/or over a network), personal profile pages, video files, image files, audio files, Web pages, log files, stack traces, and so forth. While the below examples may pertain to the clustering of feedback reports, the techniques described herein are also generally applicable to generation of clusters of various other types of resources.

In an example, the device 102 receives a feedback report 120 relating to an application that is or was running on a user device 104. In this example, device 102 receives the feedback report 120 directly from user device 104, e.g., by user device 104 sending the feedback report 120 to device 102. In another example, device 102 indirectly receives the feedback report 120, e.g., by receiving from a third-party device (not shown) information indicative of the information included in the feedback report 120. In this example, the third-party device processes the feedback report 120 to generate a summary of the feedback report 120. The third-party device sends to device 104 the processed summary of feedback report 120.

The feedback report 120 includes information indicative of a type of error that occurred in the application. The device 102 is configured to group together similar feedback reports into clusters 118. For example, when the device 102 receives a set of feedback reports, the device 102 can extract keywords from the feedback reports. In an example, device 102 receives the set of feedback reports in a batch process, in which device 102 receives a plurality of feedback reports at a time. In another example, device 102 may receive individual feedback reports, for example, at various, different points in time. Device 102 may be further configured to combine the individually received feedback reports into a set of feedback reports, for example, based on a period of time associated with receipt of the feedback reports. Independent of whether the feedback reports are individually received and/or received as part of a batch process, feedback reports that include similar keywords can be grouped together to generate clusters of feedback reports 118.

Device 102 may be any of a variety of computing devices capable of receiving information, such as a server, a distributed computing system, a desktop computer, a laptop, a cell phone, a rack-mounted server, and so forth. Device 102 may be a single system or a group of systems that are at a same location or at different locations.

Device 102 may also include a processing device (not shown) with one or more microprocessors. Generally, the processing device may include any appropriate processor and/or logic that is capable of receiving and storing data, and of communicating over a network (not shown). Device 102 may also include memory (not shown) that may include a hard drive and a random access memory storage device, such as a dynamic random access memory, or other types of non-transitory machine-readable storage devices. Non-transitory machine-readable storage devices include all machine-readable storage devices, except for a transitory, propagating signal. The memory stores computer programs that are executable by the processing device. These computer programs include feedback clustering engine 110. A bus system (not shown), including, for example, a data bus and a motherboard, may be used to establish and to control data communication between the components of device 102.

Example system 100 also includes user device 104. User device 104 is an electronic device that is under control of a user and is capable of sending data to and receiving data from device 102, e.g., over a network. User device 104 may include a personal computer, a mobile communication device, and/or other devices that may send and receive data over a network. User device 104 typically includes applications, e.g., a web browser, an email application, and a music application, for example, to facilitate the sending and the receiving of data.

Device 102 may receive information from user device 104 via an input/output ("I/O") interface (not shown). The I/O interface may be any type of interface capable of receiving information over a network, such as an Ethernet interface, a wireless networking interface, a fiber-optic networking interface, a modem, and so forth. Example system 100 also includes data repository 106. Data repository 106 is configured to store clusters 118a-118n of feedback reports 120a-120n.

In the example of FIG. 1, user device 104 includes feedback manager 112, which is configured to generate feedback reports 120 for applications that are running on user device 104. In an example, when an application running on user device 104 encounters an error that causes the application to shut down, feedback manager 112 generates a feedback report 120 and sends the feedback report 120 to device 102.

In an example, device 102 receives feedback reports 120 from numerous, different user devices 104. In this example, feedback clustering engine 110 is configured to execute a clustering process that clusters together feedback reports that have similar attributes. Generally, an attribute includes information indicative of a characteristic of a feedback report, including, e.g., a topic of the feedback report, keywords included in the feedback report, a type of error included in the feedback report, a name of the application for which the feedback report was generated, a type of application for which the feedback report was generated, a geographic location of a user device when the feedback report was generated, and so forth.

In an example, the types of clustering processes executed by feedback clustering engine 110 include a partitioning clustering process, a hierarchical agglomerative clustering ("HAC") process, a Single Link ("SLINK") clustering process, a Complete Link ("CLINK") clustering process, and a Group Average clustering process.

In an example, the clustering process implemented by feedback clustering engine 110 uses a relevance value to generate clusters of feedback reports. Generally, a relevance value includes information indicative of a measure of relevance (e.g., similarity, correspondence, and the like) of one data item to another data item, e.g., based on the attributes of the data items.

Feedback clustering engine 110 may uses various types of relevance values in the clustering process, including, e.g., resource relevance values and term relevance values. A resource relevance value includes a measure of relevance of one resource to another resource, e.g., based on attributes of the resources.

In an example, a type of resource relevance value is a term frequency-inverse document frequency ("TF-IDF") value. Generally, a TF-IDF value is a value specifying a relevance of a resource to a collection of resources and/or to another resource. In this example, the relevance of the resource is at least partly based on the relevance of a term to the resource. In particular, the relevance of a term to a resource increases proportionally to the number of times the term appears in the resource but is offset by the frequency of the term in the collection of resources.

A term relevance value includes a measure of relevance of a term to a resource and/or to a collection of resources, including, e.g., feedback reports 120a-120n. In an example, a type of term relevance value is a term frequency ("TF") value. Generally, a TF value is a value specifying a number of times a particular term is included in a resource. In particular, terms that are commonly occurring in feedback reports have a decreased relevance to assessing a similarity between feedback reports. In another example, a type of term relevance value is an inverse document frequency ("IDF") value. In this example, the IDF value is a weighted value in which a decreased weighted value is applied to terms that occur very frequently in a collection of feedback reports and an increased weighted value is applied to terms that occur less frequently in the collection.

Based on an implementation of the clustering process, feedback clustering engine 110 assigns a newly received feedback report (e.g., feedback report 120) to one of clusters 118a-118n. Clusters 118a-118n include feedback reports 120a-120n, with feedback reports 120a-120n in each of clusters 118a-118n associated with a similar attribute (e.g., a keyword, a topic, and so forth). Based on a type of attribute being used to generate clusters 118a-118n, feedback clustering engine 110 is configured to determine whether a newly received feedback report may be placed into one of pre-existing clusters 118a-118n. If there is no pre-existing cluster including feedback reports that are similar to the newly received feedback report, feedback clustering engine 110 is configured to generate a new cluster and to associate the new feedback report with the new cluster.

Feedback clustering engine 110 is configured to implement various techniques to increase an efficiency of the clustering process, including, e.g., reducing a number of feedback reports that are used in the clustering process. In an example, feedback clustering engine 110 reduces the number of feedback reports that are used in the clustering process by identifying feedback reports that include terms with term relevance values above a term relevance threshold value. Generally, a term relevance threshold value includes information specifying a pre-defined term relevance value for a term in order for device 102 to determine that the term is relevant for a clustering process. In an example, data repository 106 is configured to store information indicative of the term relevance threshold value.

To promote an ability of feedback clustering engine 110 to determine which feedback reports (e.g., from feedback reports 120a-120n) include terms that have term relevance values above the term relevance threshold value, data repository 106 includes an index (e.g., a relational database or a hash index) that maps terms to term relevance values and to feedback reports that include the terms, for example, as illustrated in the below Table 1.

TABLE 1

| Term | Term Relevance Value | Feedback report |
|------|---------------------|-----------------|
| Email | .75 | Feedback report A, Feedback report C, |
| Send | .6 | Feedback report B |
| Failure | .1 | Feedback report A, Feedback report B, Feedback report D |

As illustrated in the above Table 1, a collection of feedback reports includes feedback reports A, B, C and D. The above Table 1 includes a mapping of terms to term relevance values and to the feedback reports that include the terms. For example, the term "email" has a term relevance value of 0.75 and is included in feedback reports A and C. The term "send" has a term relevance value of 0.6 and is included in feedback report B. The term "failure" has a term relevance value of 0.1 and is included in feedback reports A, B and D.

In this example, feedback report 120 includes the terms "email," "send," and "failure," and the term relevance threshold value is 0.5. Feedback clustering engine 110 identifies terms included in feedback report 120 that have a term relevance value above the term relevance threshold value, namely, terms "email" and "send," as indicated in the above Table 1. Feedback clustering engine 110 then uses in the clustering process the feedback reports that include the terms "email" and/or "send," namely, feedback reports A, B, and C, for example, rather than all of feedback reports A, B, C and D.

In another example, feedback clustering engine 110 is configured to determine an aggregate term relevance value for a feedback report, e.g., by aggregating the values of the individual term relevance values of the terms in the feedback report. In this example, feedback clustering engine 110 performs the clustering process on feedback reports with aggregate term relevance values above the term relevance threshold value.

To further increase an efficiency of the clustering process, feedback clustering engine 110 is further configured to generate a ranked list of the feedback reports that include terms with term relevance values above the term relevance threshold value, as described above. In particular, the feedback reports are ranked based on a resource relevance value for the feedback reports. In this example, the resource relevance value is a measure of relevance of a feedback report to the newly received feedback report, namely, feedback report 120. The resource relevance value may be at least partly based on a TF value for a particular term and the IDF value for the particular term.

In this example, the feedback report that is ranked first in the list is determined to be the most relevant feedback report for a particular term, relative to the other feedback reports for the term. Accordingly, the first feedback report in the ranked list has an increased relevance value for the clustering process, for example, relative to the other feedback reports in the ranked list.

In an example, feedback clustering engine 110 is configured to perform the clustering process using a predefined number ("N") of feedback reports in the ranked lists for the terms on which clustering is performed, for example, the first five feedback reports, the first one-hundred feedback reports, and so forth. That is, feedback clustering engine 110 processes only the first N feedback reports for each term and ignores remaining feedback reports for the terms.

Referring back to the foregoing example of Table 1, the terms with term relevance values above the term relevance threshold value are the terms "email" and "send." Also, as further illustrated in the above Table 1, feedback reports A and C include the term "email" and feedback report B includes the term "send." In this example, feedback clustering engine 110 calculates resource relevance values for feedback reports A and C, with regard to the term "email," and a resource relevance value for feedback report B, with regard to the term "send," as illustrated in the below Table 2.

TABLE 2

| Term | Feedback report | Resource Relevance Value |
|---|---|---|
| Email | Feedback report A | 1 |
|  | Feedback report C | 2 |
| Send | Feedback report B | 1 |

As indicated in the above Table 2, the feedback reports are ranked based on resource relevance values. For example, for the term "email," feedback report A is associated with a resource relevance value of "1" and feedback report C is associated with a resource relevance value of "2," thereby indicating that feedback report A is ranked above feedback report C in the ranked list and is therefore more relevant than feedback report C to feedback report 120. Because the term "send" is only included in a single feedback report, namely feedback report B, the resource relevance value for feedback report B is "1."

In this example, the value for N is "1," indicating that feedback clustering engine 110 selects the first feedback report (e.g., the feedback report ranked above all the other feedback reports in a ranked list) in the ranked lists for each of the terms "email" and "send." Accordingly, feedback clustering engine 110 selects feedback reports A and B and performs clustering using these feedback reports.

Figure 2:
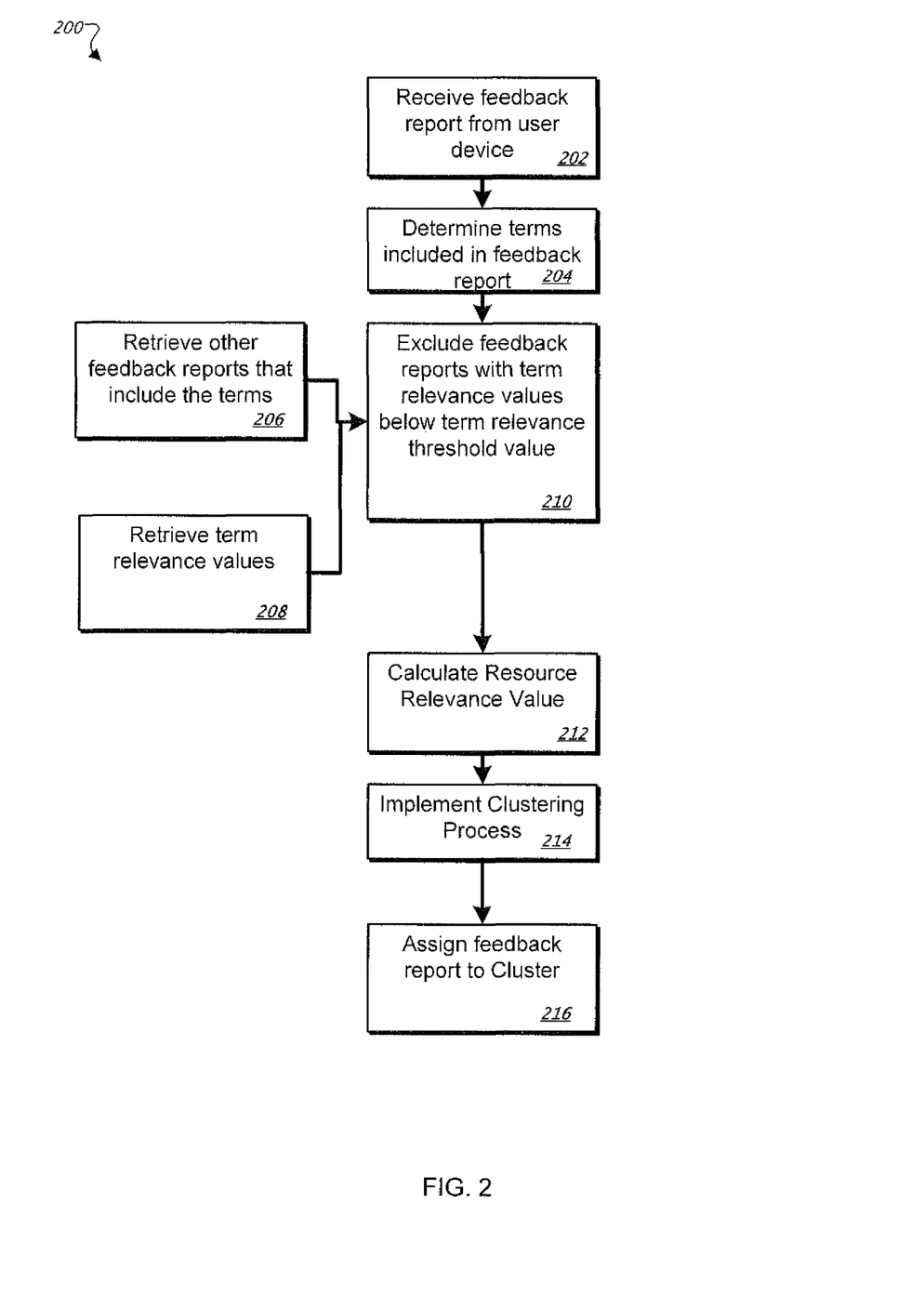
FIG. 2 is a flow diagram of an example process for clustering feedback reports.

FIG. 2 is a flow diagram of an example process 200 for clustering feedback reports 120. In operation, feedback clustering engine 110 receives (202) a feedback report 120 from a user device 104. Feedback clustering engine 110 determines (204) one or more terms that are included in feedback report 120. For each term included in the feedback report 120, feedback clustering engine 110 retrieves (206) from data repository 106 other feedback reports ("retrieved feedback reports") that include the term, e.g., by using the mapping of terms to feedback reports that is stored in data repository, e.g., as described above with regard to Table 1. Additionally, for each term included in feedback report 120, feedback clustering engine 110 retrieves (208) from data repository 106 a term relevance value, as illustrated in the foregoing Table 1.

Feedback clustering engine 110 excludes (210) from the retrieved feedback reports those feedback reports including terms associated with term relevance values that are below a threshold term relevance value. In an example, feedback clustering engine 110 is configured to exclude retrieved feedback reports including one or more terms associated with term relevance values that are below a threshold term relevance value. In another example, feedback clustering engine 110 is configured to exclude retrieved feedback reports that only include terms associated with term relevance values that are below the threshold term relevance value (e.g., if a feedback report includes one or more terms associated with a term relevance value above the threshold term relevance value, then the feedback report that includes the terms is not excluded from the group of retrieved feedback reports).

In a variation, feedback clustering engine 110 generates a group of terms included in the retrieved feedback reports terms. Feedback clustering engine 110 excludes from the group of terms those terms associated with term relevance values that are below a threshold term relevance value.

For the retrieved feedback reports including terms (and/or terms from the group of terms) with term relevance values that are above the threshold term relevance value, feedback clustering engine 110 calculates (212) a resource relevance value indicative of a similarity between a particular feedback report in the retrieved feedback reports and feedback report 120.

In an example, the resource relevance value is a TF-IDF value. In this example, data repository 106 stores information specifying IDF values for the terms included in the retrieved feedback reports. Data repository 106 also includes information specifying TF values for the retrieved feedback reports. In this example, feedback clustering engine 110 is configured to use the TF values and the IDF values to generate TF-IDF values for each feedback report with term relevance values that are above the threshold term relevance value.

In this example, feedback clustering engine 110 ranks (214) feedback reports based on the resource relevance values associated with the feedback reports, for example, as illustrated in the above Table 2. Feedback clustering engine 110 also selects (216) the first N feedback reports. For example, as also previously described with regard to Table 2, feedback clustering engine 110 selects the first feedback report from each of the ranked lists and therefore selects feedback reports A and B. Using the selected feedback reports, feedback clustering engine 110 implements (218) a clustering process. Using the results of the clustering process, feedback clustering engine 110 assigns (220) feedback report 120 to one of clusters 118a-118n.

Feedback clustering engine 110 is also configured to implement numerous techniques to increase the scalability of the clustering process, including, e.g., mapping of feedback reports to terms with increased relevance, re-clustering of clusters, and sharding of clusters, each of which are described in further detail below.

In an example, numerous feedback reports include a particular term. In this example, feedback clustering engine 110 may be configured to generate a mapping among the terms and each of the feedback reports that include the term. In an example, an index in data repository 106 may include information indicative of the mapping, e.g., as illustrated in the above Table 2.

In another example, rather than generating a mapping among a term and the feedback reports that include the term, feedback clustering engine 110 may be configured to generate a mapping among the term and feedback reports associated with relevance values (e.g., TF-IDF values) above a threshold relevance value. By doing so, feedback clustering engine 110 is configured to generate mappings for the feedback reports having increased relevance to particular terms, e.g., relative to the relevance of other feedback reports to the particular terms.

In this example, feedback clustering engine 110 is configured to generate relevance values for the terms in a feedback report. For a particular feedback report, feedback clustering engine 110 is further configured to index terms in the feedback report associated with relevance values above the threshold relevance value in the feedback report.

In another example, feedback clustering engine 110 is configured to generate a mapping between a pre-defined number terms in a feedback report (e.g., the top five most relevant terms for the feedback report). In this example, feedback clustering engine 110 determines the pre-defined number of terms associated with highest term relevance values (e.g., relative to the other term relevance values of the other terms). Feedback clustering engine 110 generates a mapping among the feedback report and the pre-defined number of terms associated with highest term relevance values. In an example of a cluster feedback report, feedback clustering engine 110 is configured to perform a similar technique on the most relevant terms in the cluster feedback report relative to all the terms in the cluster feedback report, e.g., rather than generating a mapping among the cluster feedback report and all the terms included in the cluster feedback report.

In an example, to increase the scalability of the clustering process, feedback clustering engine 110 is further configured to not re-cluster feedback reports, e.g., unless there is a change in the feedback reports. In this example, feedback clustering engine 110 can be configured to re-cluster feedback reports when device 102 receives a new feedback report that needs to be added to a cluster. In an example, clusters of reports and indexes are stored in memory for fast incremental clustering of new reports.

In another example, to increase the scalability of the clustering process, feedback clustering engine 110 is further configured to shard a cluster (e.g., one of clusters 118a-118n) to determine an relevance of the feedback reports in a cluster in relation to each other. Generally, sharding includes a partitioning of data into numerous segments, including, e.g., a first segment, a second segment, a third segment, a fourth segment, and so forth. In an example, a segment is a data structure that may be populated with data, e.g., feedback reports. Accordingly, a shard is a data structure that includes a number of segments.

By sharding a cluster, feedback clustering engine 110 partitions the cluster into segments. Each segment includes numerous feedback reports. Additionally, each segment is indicative of an relevance of the feedback reports to the cluster as a whole. Typically, feedback reports included in first and second segments of the shard are more relevant than feedback reports included in third and fourth segments of the shard, e.g., as indicated by relevance values of the feedback reports, which are described in further detail below.

In an example, device 102 is configured to define an relevance value to measure an relevance of a feedback report in a cluster (or clusters) relative to other feedback reports in the cluster (or clusters). In this example, the relevance value includes information specifying whether a feedback report is associated with a high-priority error (e.g., as defined by a developer of an application).

In another example, the relevance value includes information indicative of a number of feedback reports in a cluster that are associated with a same error. In this example, as the number of feedback reports associated with a particular error increases, the relevance of the error also increases, e.g., because the increased number of feedback reports indicates that the error is widespread among numerous user devices.

In still another example, the relevance value may be based on a timestamp associated with a feedback report. In this example, a value of the relevance value for a feedback report increases as the time stamp for the feedback report is more recent, e.g., relative to the timestamps of other feedback reports.

In an example, feedback clustering engine 110 shards a cluster based on an attribute of the cluster, including, e.g., a category of the feedback reports included in the cluster, a time stamp of the feedback reports, an error message in the feedback reports, an error code in the feedback reports, and so forth. Using the determined attribute, feedback clustering engine 110 also generates relevance values in accordance with the determined attribute. For example, if a cluster is sharded based on timestamps associated with the feedback reports, then feedback clustering engine 110 generates relevance values to specify that feedback reports associated with more recent timestamps are more relevant than feedback reports associated with less recent time stamps.

Prior to performance of the sharding, feedback clustering engine 110 generates numerous segments of a pre-defined length. For a particular cluster including feedback reports, feedback clustering engine 110 determines a number of feedback reports from the cluster that can be included in a first segment of the shard, given the pre-defined length of the segment. Feedback clustering engine 110 selects from the cluster the determined number of feedback reports and populates the segment with the selected feedback reports.

In an example, the number of feedback reports in the cluster exceeds the number of feedback reports placed in the first segment of the shard. In this example, feedback clustering engine 110 generates a second segment and selects from the cluster another set of feedback reports. Feedback clustering engine 110 populates the second segment with the second set of feedback reports, and so forth, until all of the feedback reports in the cluster have been placed in segments of the shard.

In an example, feedback clustering engine 110 is configured to populate the segments of a shard based on a time stamp associated with the feedback reports in the clusters. In this example, when an application encounters an error, numerous feedback reports for the error are generated by the various user devices running the application. When an error in the application running on the user devices occurs at the same time, the feedback reports for the application are also generated at the same time and are therefore associated with similar timestamps. For these reasons, feedback reports for a particular error with an application are usually correlated in time.

Accordingly, by populating a segment of a shard with feedback reports that are correlated in time (e.g., in close proximity to one another with regard to time), feedback clustering engine 110 is configured to populate a segment of a shard with feedback reports that relate to the same error in an application. In this example, feedback clustering engine 110 is configured to assign relevance values with higher values to feedback reports associated with more recent timestamps (e.g., relative to the timestamps of other feedback reports).

In an example, feedback clustering engine 110 is further configured to populate the segments in an order such that feedback reports with relevance values of higher values are placed in segments before feedback reports with relevance values of lower values. By doing so, the first segment in the shard includes the "most" relevant feedback reports, including, e.g., feedback reports associated with more recent timestamps relative to the timestamps of other feedback reports.

In another example, feedback clustering engine 110 is configured to determine a set of feedback reports associated with relevance values that are above a threshold relevance value. Generally, a threshold relevance value includes a pre-defined relevance value to be attained by a feedback report for the feedback report to be associated with a pre-defined level of relevance. In this example, feedback clustering engine 110 is configured to first populate a segment of a shard with feedback reports associated with relevance values exceeding the threshold relevance value.

In another example, by sharding a cluster based on timestamps associated with feedback reports, feedback clustering engine 110 is configured to detect frequently occurring errors in applications. In this example, by sharding feedback reports based on a timestamp associated with the feedback reports, a segment of a shard is likely to be populated with feedback reports for a same error, because feedback reports for the same error in an application are usually correlated in time. Accordingly, the first generated segment in a shard is likely to include feedback reports associated with a recent and a commonly occurring error in an application, at least because (i) the first segment is populated with feedback reports associated with the most current timestamps (e.g., relative to the other timestamps for other feedback reports), and (ii) errors that are commonly occurring for a same problem are likely to occur in close time proximity to one another. Therefore if a recent error is commonly occurring, it is more likely that feedback reports for this error will be associated with recent and consecutive timestamps and are therefore more likely to be populated in the first segment.

In an example, once a cluster has been sharded, feedback clustering engine 110 is configured to remove duplicative feedback reports from the segments of the shard. In this example, feedback clustering engine 110 parses the feedback reports for error messages and/or error codes included in the feedback reports. When feedback clustering engine 110 determines feedback reports that include the same (and/or similar) error messages and/or error codes, feedback clustering engine 110 removes the feedback reports from the segment, except for a single feedback report. By doing so, feedback clustering engine 110 is configured to eliminate duplicative feedback reports from a segment of a shard.

As previously described herein, if a cluster is sharded in accordance with timestamps associated with the feedback reports, then there is an increased probability of the feedback reports associated with a same error being arranged next to each other in a segment of a shard. Accordingly, feedback clustering engine 110 may be configured to determine duplicative feedback reports by comparing two feedback reports that are next to each other in a segment.

When feedback clustering engine 110 determines two feedback reports that pertain to the same error, feedback clustering engine 110 determines the start of a sequence of duplicative feedback reports. In this example, feedback clustering engine 110 continues comparing feedback reports that are next to each in the segment, e.g., until feedback clustering engine 110 determines two feedback reports that are not related to the same error. Upon identifying two feedback reports that are not related to the same error, feedback clustering engine 110 determines an end of the sequence of duplicative feedback reports.

Feedback clustering engine 110 eliminates from the segment all the feedback reports in the sequence of duplicative feedback reports, except for one. By doing so, a first segment of a shard includes a non-duplicative listing of feedback reports associated with the most relevant errors for a cluster, e.g., because feedback reports associated with relevance values having higher values are placed in segments before feedback reports associated with relevance values having lower values.

In another example, feedback clustering engine 110 is configured to generate cross-cluster shards, e.g., by generating a shard with segments that are populated with feedback reports from more than one cluster. In this example, a cluster includes feedback reports for a particular application. Feedback clustering engine 110 merges numerous clusters together and shards the feedback reports associated with the numerous clusters.

By sharding numerous clusters, with each cluster including feedback reports for a single application, feedback clustering engine 110 generates cross-cluster shards to determine the errors that are most relevant across the numerous applications represented by the numerous clusters. In this example, feedback clustering engine 110 uses the foregoing techniques to populate segments of the shard with feedback reports from the numerous clusters such that feedback reports associated with relevance values of higher values are placed in a segment before feedback reports associated with relevance values of lower values. Additionally, using the foregoing techniques, feedback clustering engine 110 is configured to remove duplicative feedback reports from the segments of the cross-cluster shard.

In another example, feedback clustering engine 110 shards individual clusters and merges the shards of the individual clusters together, e.g., by re-sharding the shards of the individual clusters. By doing so, feedback clustering engine 110 generates a shard in which the first segment includes the most relevant feedback reports from the numerous clusters, e.g., relative to the relevance of the other feedback reports in the numerous clusters.

In an example, a user of device 102 can use a shard from a cluster to determine the errors that frequently occur in an application, e.g., without having to analyze each of the feedback reports in the cluster. In particular, the segments in the shard of the cluster (or across numerous clusters) provide the user with a ranking of feedback reports in a pre-determined order of relevance, e.g., based on an relevance value that the user has specified or that device 102 has defined.

In an example, device 102 is configured to collect feedback reports for ten, different applications that may run on user device 104. In this example, a user of device 102 wants to determine the three most frequently occurring errors for the ten, different applications. In this example, data repository 106 stores information indicative of ten, different clusters, with each cluster including feedback reports for one of the ten, different applications. From the ten, different clusters, feedback clustering engine 110 generates a cross-cluster shard and removes duplicative feedback reports from the cross-cluster shard. By doing so, feedback clustering engine 110 generates a shard in which a first segment of the shard includes the three most important errors for the ten applications.

In an example, device 102 is configured to store the shards in data repository 106. In this example, feedback clustering engine 110 is configured to update the shards when the data in shards changes, for example, upon receipt of a new feedback report.

Feedback clustering engine 110 is also configured to re-shard the shards, for example, upon receipt of a new feedback report. In this example, similar reports are placed in one shard. Reports that are not similar to any other reports in their respective shard are moved out of the shard to a common shard. In an example, the common shard is re-sharded at a later point in time.

Feedback clustering engine 110 is also configured to perform offline re-sharding and online re-sharding. Generally, offline re-sharding includes redistributing the feedback reports included in shards at a time when device 102 is not receiving new feedback reports. In an example, feedback clustering engine 110 is configured to perform offline re-sharding when the shards generated by feedback clustering engine 110 are fully populated. In this example, feedback clustering engine 110 performs re-sharding to remove the old feedback reports from the generated shards and to make room for more recent feedback reports in the generated shards.

Online re-sharding includes redistributing the feedback reports among the shards when an incoming feedback report is received by device 102 and assigning the feedback report to an appropriate shard.

Figure 3:
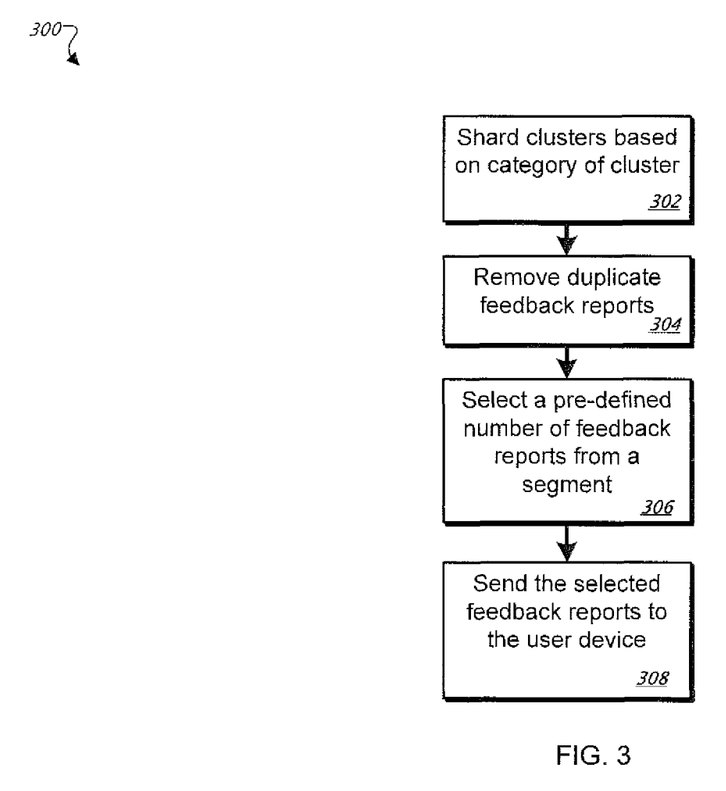
FIG. 3 is a flow diagram of an example process for sharding feedback reports.

FIG. 3 is a flow diagram of an example process 300 for sharding feedback reports 120a-120n. In operation, feedback clustering engine 110 shards (302) clusters 118a-118n, e.g., based on the types of feedback reports included in clusters 118a-118n. Feedback clustering engine 110 removes (304) duplicative feedback reports from the shard.

Feedback clustering engine 110 selects (306) a pre-defined number of feedback reports from a segment of the shard. For example, feedback clustering engine 110 can be configured to select the first five feedback reports in a segment of shard. In this example, the first five feedback reports in the segment of the shard pertain to the five most frequently occurring errors encountered by a particular application running on user device 104. Feedback clustering engine 110 processes (308) the selected feedback reports, for example, to generate information indicative of a number of frequently occurring errors in an application associated with the feedback reports.

Using the techniques described herein, device 102 is configured to generate clusters 118a-118n of feedback reports 120a-120n. Additionally, device 102 is also configured to shard clusters 118a-118n, for example, to output feedback reports associated with relevance values that are above a threshold relevance value.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, or tactile feedback). Input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. Other steps may be provided, or steps may be eliminated, from the described flows, and other components may be added to, or removed from, the described systems.

A number of implementations have been described. Nevertheless, it will be understood that various modifications may be made without departing from the spirit and scope of the processes and techniques described herein. For example, feedback clustering engine 110 may be configured to represent a cluster of feedback reports as a single feedback report ("cluster feedback report") that includes a list of the terms included in the feedback reports in the cluster. Feedback clustering engine 110 is further configured to perform the foregoing techniques to generate a mapping among the terms and the various cluster feedback reports Using the techniques described above, feedback clustering engine 110 is configured to generate a term relevance value for each term that is mapped to a cluster feedback report. In this example, feedback clustering engine 110 is configured to determine the terms with term relevance values above the threshold term relevance value. Feedback clustering engine 110 performs comparisons between feedback report 120 and cluster feedback reports that include terms with term relevance values above the threshold term relevance value.

Based on the comparisons, feedback clustering engine 110 determines a similarity between feedback report 120 and cluster feedback reports that include terms with term relevance values above the threshold term relevance value, e.g., based on a value of a term relevance value assigned to a cluster feedback report. Feedback clustering engine 110 is configured to assign feedback report 120 to the cluster associated with the cluster feedback report that is most similar to feedback report 120, e.g., relative to the other cluster feedback reports. In this example, feedback clustering engine 110 is configured to assign feedback report 120 to a cluster with a cluster feedback report having a term relevance value that is higher than the term relevance value of other cluster feedback reports.

Accordingly, other implementations not specifically described herein are also within the scope of the following claims.

What is claimed is:

1. A computer-implemented method comprising:
   receiving, from a user device, a first feedback report that is submitted by a user and that relates to an application configured to run on the user device, wherein the first feedback report includes one or more terms;
   retrieving a term relevance value for each of the one or more terms, each term relevance value being indicative of a relevance of the term to a collection of feedback reports that are assigned to a plurality of clusters of feedback reports;
   identifying one or more second feedback reports from the collection of feedback reports, each of the one or more second feedback reports including at least one term of the one or more terms that is associated with a term relevance value that satisfies a threshold value; and
   assigning the first feedback report to a cluster of feedback reports based on performing a clustering process on the first feedback report using the one or more second feedback reports.

2. The computer-implemented method of claim 1, wherein a term relevance value for a term is at least partly based on a number of the one or more second feedback reports in the collection of feedback reports that include the term.

3. The computer-implemented method of claim 1, further comprising:
   sharding the cluster by generating one or more segments and populating the one or more segments with feedback reports in the collection of feedback reports that are assigned to the cluster.

4. The computer-implemented method of claim 3, further comprising:
   generating a resource relevance value for a feedback report assigned to the sharded cluster, with the resource relevance value indicative of a relevance of the feedback report to a pre-defined attribute.

5. The computer-implemented method of claim 4, further comprising:
   populating the one or more segments based on resource relevance values of feedback reports assigned to the sharded cluster, with feedback reports associated with higher resource relevance values being placed in a segment before feedback reports associated with lower resource relevance values.

6. The computer-implemented method of claim 1, further comprising:
   generating one or more resource relevance values for the one or more second feedback reports, with a resource relevance value indicative of a relevance of a second feedback report to the first feedback report;
   wherein the assigning the first feedback report to the cluster is at least partly based on the one or more resource relevance values of the one or more second feedback reports that are associated with the cluster.

7. The computer-implemented method of claim 1, wherein a term relevance value for a term is pre-defined.

8. One or more non-transitory machine-readable media configured to store instructions that are executable by one or more computing devices to perform operations comprising:
   receiving a first feedback report that is submitted by a user and that relates to an application configured to run on the one or more computing devices, wherein the first feedback report includes one or more terms;
   retrieving a term relevance value for each of the one or more terms each term relevance value being indicative of a relevance of the term to a collection of feedback reports that are assigned to a plurality of clusters of feedback reports;
   identifying one or more second feedback reports from the collection of feedback reports, each of the one or more second feedback reports including at least one term of the one or more terms that is associated with a term relevance value that satisfies a threshold value; and
   assigning the first feedback report to a cluster of feedback reports based on performing a clustering process on the first feedback report using the one or more second feedback reports.

9. The one or more machine-readable media of claim 8, wherein a term relevance value for a term is at least partly based on a number of the one or more second feedback reports in the collection of feedback reports that include the term.

10. The one or more machine-readable media of claim 8, wherein the operations further comprise:
    sharding the cluster by generating one or more segments and populating the one or more segments with feedback reports in the collection of feedback reports that are assigned to the cluster.

11. The one or more machine-readable media of claim 10, wherein the operations further comprise:
    generating a resource relevance value for a feedback report assigned to the sharded cluster, with the resource relevance value indicative of a relevance of the feedback report to a pre-defined attribute.

12. The one or more machine-readable media of claim 11, wherein the operations further comprise:
    populating the one or more segments based on resource relevance values of feedback reports assigned to the sharded cluster, with feedback reports associated with higher resource relevance values being placed in a segment before feedback reports associated with lower resource relevance values.

13. The one or more machine-readable media of claim 8, wherein the operations further comprise:
    generating one or more resource relevance values for the one or more second feedback reports, with a resource relevance value indicative of a relevance of a second feedback report to the first feedback report;
    wherein assigning the first feedback report to the cluster is at least partly based on the one or more resource relevance values of the one or more second feedback reports that are associated with the cluster.

14. The one or more machine-readable media of claim 8, wherein identifying the one or more second feedback reports from the collection of feedback reports comprises:

excluding at least one of the feedback reports from the collection of feedback reports that includes at least one term of the one or more terms.

15. An electronic system comprising:
one or more computing devices; and
one or more non-transitory machine-readable media configured to store instructions that are executable by the one or more computing devices to perform operations comprising:
receiving a first feedback report that is submitted by a user and that relates to an application configured to run on the one or more computing devices, wherein the first feedback report includes one or more terms;
retrieving a term relevance value for each of the one or more terms each term relevance value being indicative of a relevance of the term to a collection of feedback reports that are assigned to a plurality of clusters of feedback reports;
identifying one or more second feedback reports from the collection of feedback reports, each of the one or more second feedback reports including at least one term of the one or more terms that is associated with a term relevance value that satisfies a threshold value; and
assigning the first feedback report to a cluster of feedback reports based on performing a clustering process on the first feedback report using the one or more second feedback reports.

16. The electronic system of claim 15, wherein a term relevance value for a term is at least partly based on a number of the one or more second feedback reports in the collection of feedback reports that include the term.

17. The electronic system of claim 15, wherein the operations further comprise:
sharding the cluster by generating one or more segments and populating the one or more segments with feedback reports in the collection of feedback reports that are assigned to the cluster.

18. The electronic system of claim 17, wherein the operations further comprise:
generating a resource relevance value for a feedback report assigned to the sharded cluster, with the resource relevance value indicative of a relevance of the feedback report to a pre-defined attribute.

19. The electronic system of claim 18, wherein the operations further comprise:
populating the one or more segments based on resource relevance values of feedback reports assigned to the sharded cluster, with feedback reports associated with higher resource relevance values being placed in a segment before feedback reports associated with lower resource relevance values.

20. The electronic system of claim 15, wherein the operations further comprise:
generating one or more resource relevance values for the one or more second feedback reports, with a resource relevance value indicative of a relevance of a second feedback report to the first feedback report;
wherein assigning the first feedback report to the cluster is at least partly based on the one or more resource relevance values of the one or more second feedback reports that are associated with the cluster.

21. The electronic system of claim 15, wherein identifying the one or more second feedback reports from the collection of feedback reports comprises:
excluding at least one of the feedback reports from the collection of feedback reports that includes at least one term of the one or more terms.

22. An electronic system comprising:
means for receiving a first feedback report related to an application configured to run on one or more computing devices;
means for retrieving a term relevance value for each of the one or more terms, each term relevance value being indicative of a relevance of the term to a collection of feedback reports that are assigned to a plurality of feedback reports;
means for identifying one or more second feedback reports from the collection of feedback reports, each of the one or more second feedback reports including at least one term of the one or more terms that is associated with a term relevance value that satisfies a threshold value; and
means for assigning the first feedback report to a cluster of feedback reports based on performing a clustering process on the first feedback report using the one or more second feedback reports.

* * * * *